Oct. 20, 1931.    C. C. HANSEN    1,828,185
AIR LINE OILER
Filed April 27, 1928
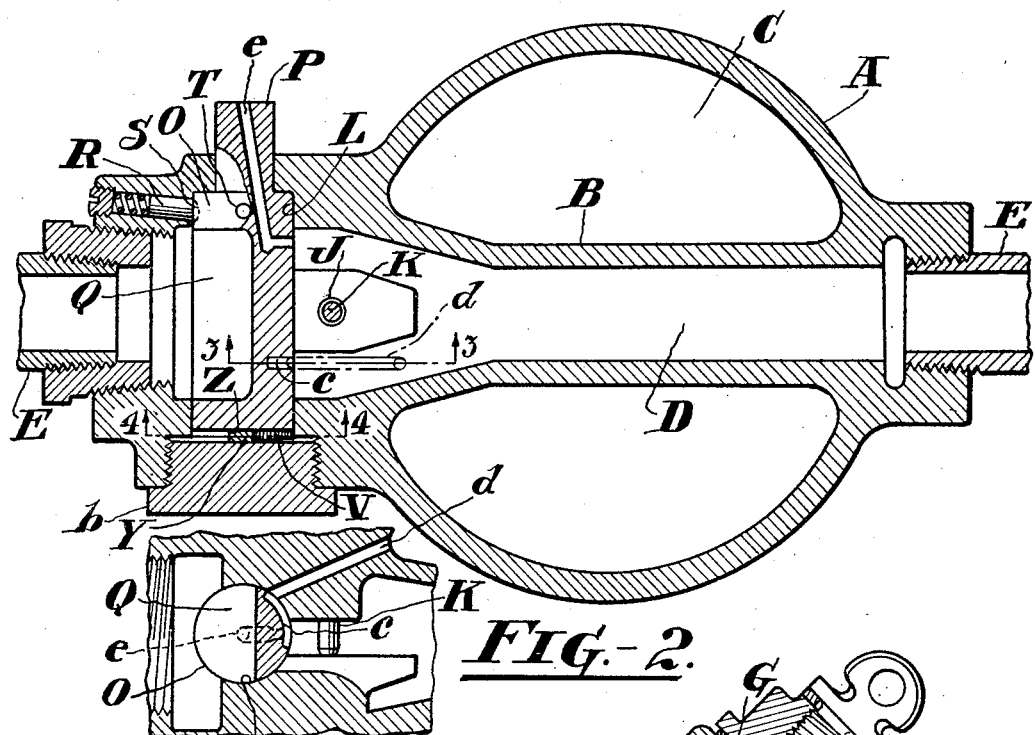
FIG.-2.
FIG.-3.
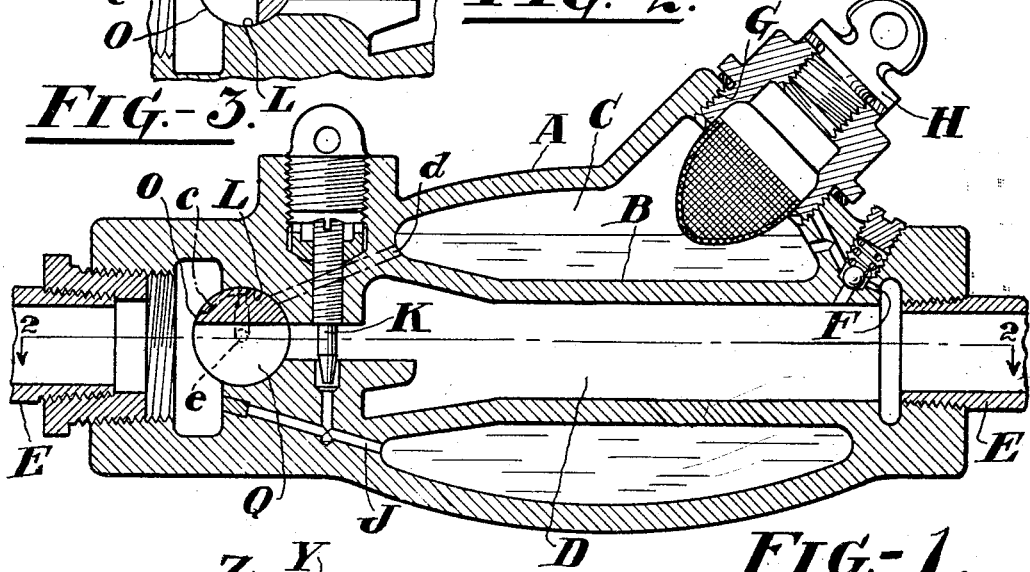
FIG.-1.
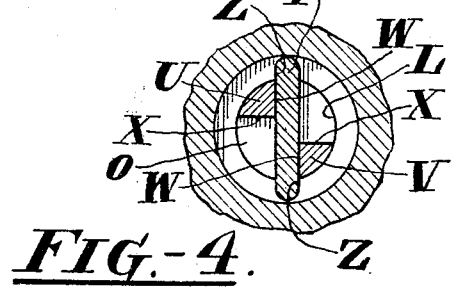
FIG.-4.
INVENTOR.
Charles C. Hansen
BY
HIS ATTORNEY.

Patented Oct. 20, 1931

1,828,185

UNITED STATES PATENT OFFICE

CHARLES C. HANSEN, OF EASTON, PENNSYLVANIA, ASSIGNOR TO INGERSOLL-RAND COMPANY, OF JERSEY CITY, NEW JERSEY, A CORPORATION OF NEW JERSEY

AIR LINE OILER

Application filed April 27, 1928. Serial No. 273,414.

This invention relates to oiling devices, but more particularly to an oiler adapted to be attached to an air line for supplying lubricant to a machine or motor through the medium of the pressure fluid whereby the motor is actuated.

The objects of the invention are to facilitate the operation of replenishing the supply of oil in the oiler and to prevent tht ejection of oil from the reservoir into the air line during the idle period of the machine to which the oil is being supplied.

Other objects will be in part obvious and in part pointed out hereinafter.

In the drawings illustrating the invention and in which similar reference characters refer to similar parts, Figure 1 is a longitudinal sectional elevation of an oiler having the invention applied thereto, Figure 2 is a plan view in section taken through Figure 1 on the line 2—2 looking in the direction indicated by the arrows, and Figures 3 and 4 are sectional elevations of details taken on the lines 3—3 and 4—4 in Figure 2 looking in the direction indicated by the arrows.

Referring to the drawings, A designates a casing having a tubular wall B which divides the casing into an oil reservoir C and a passageway D. The ends of the passageway D are threaded for connection to an air line E through which pressure fluid flows from a source of supply to a machine intended to be actuated thereby.

In some respects the oiler resembles that disclosed in the copending application of Charles C. Hansen Serial No. 177,954, filed March 24, 1927, now Patent No. 1,757,084, particularly with respect to the manner in which the pressure is created on the surface of the oil in the reservoir C and the manner in which the lubricant is delivered into the passageway. The oiler accordingly has a passage F which affords communication between the passageway D and the reservoir C for admitting pressure fluid into the reservoir to act on the surface of the oil, such oil being introduced into the reservoir through an opening G normally sealed by a filler plug H. A passage J in the casing A serves to convey lubricant from the reservoir into the passageway D, and the outlet opening of said passage J is controlled by an adjustable needle valve K threaded into the casing A. The passages F and J are of such proportions that oil will not flow therethrough in sufficient quantities to flood the passageway D by the mere force of gravity alone, but the flow of lubricant will depend upon a preponderance of pressure of fluid in the reservoir C over the pressure of fluid in the passageway.

In accordance with the practice of the invention, the casing A is provided at one end with a bore forming a valve chamber L which extends transversely of the passageway D wherewith it conjoins. In the valve chamber L is disposed a throttle valve O having a stem P which extends to the exterior of the casing a sufficient distance to be engaged by a wrench or other suitable device for rotating the throttle valve. The throttle valve O is provided with a recess Q of substantially the same cross sectional area as the passageway D to permit a free flow of pressure fluid therethrough in the open position of the throttle valve.

Any suitable means may be provided for holding the throttle valve O in its opened and closed positions. The means provided for this purpose in the present instance consists of a spring pressed plunger R slidable in the casing and adapted to engage depressions S and T in the periphery of the throttle valve O.

Convenient means are provided for limiting the degree of rotary movement of the throttle valve. To this end a pair of lugs U and V are formed on one end of the throttle valve and said lugs U and V are provided with flat surfaces W and X to engage a key Y seated in a slot Z in the casing A. The key Y is held firmly in the slot Z by means of a plug $b$ which forms a closure for one end of the valve chamber L. The lugs U and V are so located with respect to each other that only a quarter of a turn of the throttle valve will be necessary to rotate it either to the open or closed position.

In order to enable such pressure fluid as is entrapped in the reservoir C to escape therefrom after the throttle valve O has been closed, said throttle valve is provided with a groove c in its periphery to register with a passage d leading from the reservoir C at a point normally above the oil level in the reservoir to the valve chamber L. The groove c is so located and of such proportions that when the throttle valve is closed, said groove will also be in communication with the passageway D. A passage e in the throttle valve O affords communication between the passageway D and the atmosphere.

The cross sectional areas of the passage d and the groove c may be somewhat greater than the cross sectional area of the passage e, so that the pressure of fluid in the reservoir C and in the passageway D will remain substantially equal during the exhaust of pressure fluid from the passageway D through the passage e. Due to this construction, the flow of lubricant from the reservoir C to the passageway D through the restrictive outlet of the passage J will be neglible.

The operation of the device is as follows: During the operation of the drill or other machine to which lubricant is being supplied through the medium of the pressure fluid flowing through the passageway D, a portion of pressure fluid flows through the passage F into the reservoir C to create a pressure on the oil therein. Due to this pressure and the pulsations which occur in the air line, a suitable supply of lubricant is drawn from the passage J into the passageway D and conveyed by the pressure fluid to the machine intended to be lubricated.

After the machine to which the lubricant is being supplied has been shut off, the throttle valve O may be rotated to the closed position. In this position the groove c will establish communication between the passage d and the passageway D and the pressure fluid entrapped in the reservoir C may then flow therefrom into the passageway D and thence escape to the atmosphere through the passage e. This is a desirable feature since it prevents the ejection of oil from the reservoir into the passageway D during the idle period of the machine.

The present invention is also particularly advantageous for replenishing the supply of lubricant in the reservoir since it enables the operator to readily and conveniently cut off the supply of pressure fluid into the reservoir. Moreover, by bleeding the pressure fluid from the reservoir after the throttle valve O has been closed, the filling plug H may be safely removed without danger of oil being blown against the operator upon such removal. Since at the time it is desired to refill the reservoir C the level of the lubricant in the reservoir will be well below the opening of the passage d in the wall of the reservoir so that oil will not be forced through this passage to the passageway D.

I claim:

1. An air line oiler comprising a casing having a wall to divide the casing into a reservoir for oil and a passageway for pressure fluid, said casing having an inlet passage for conveying pressure fluid from the passageway into the reservoir and an outlet passage for conveying oil from the reservoir into the passageway, a valve chamber in the casing, a throttle valve in the valve chamber for controlling the admission of pressure fluid into the passageway, said throttle valve having a groove, and a passage in the casing leading from the reservoir to the valve chamber and registering with the groove in the closed position of the valve for exhausting pressure fluid from the reservoir into the passageway.

2. An air line oiler comprising a casing having a wall to divide the casing into a reservoir for oil and a passageway for pressure fluid, said casing having an inlet passage for conveying pressure fluid from the passageway into the reservoir and an outlet passage for conveying oil from the reservoir into the passageway, a valve chamber in the casing, an exhaust passage in the casing leading from the valve chamber to the reservoir, a throttle valve in the valve chamber for controlling the admission of pressure fluid into the passageway, said throttle valve having a groove to register with the exhaust passage in the closed position of the throttle valve for exhausting pressure fluid from the reservoir into the passageway, and a passage in the throttle valve for exhausting pressure fluid from the passageway to the atmosphere after the throttle valve has been closed.

In testimony whereof I have signed this specification.

CHARLES C. HANSEN.